Patented Feb. 14, 1939

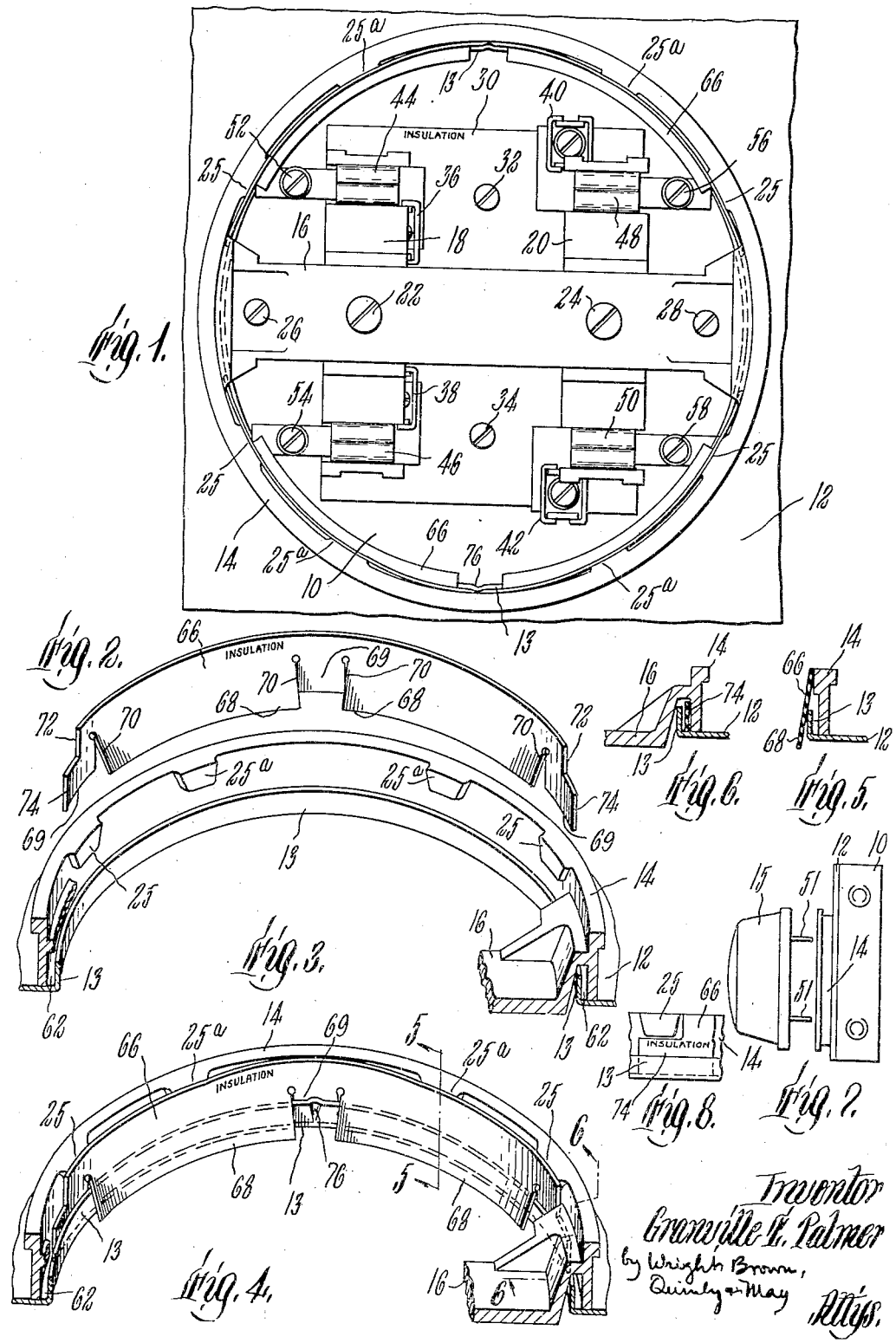

2,146,843

UNITED STATES PATENT OFFICE 2,146,843

INSULATION FOR METER TROUGHS

Granville E. Palmer, Cambridge, Mass.

Application April 9, 1938, Serial No. 201,060

4 Claims. (Cl. 247—2)

This invention relates to troughs or boxes on which electric meters are adapted to be removably mounted.

Troughs of this kind have come into wide use and are illustrated and described, for example, in the McKinley and Palmer application Serial No. 156,760, filed July 31, 1937; in the Bradshaw and Johansson application Serial No. 118,590, filed December 31, 1936, and in the Palmer application Serial No. 186,791, filed January 25, 1938. These troughs are characterized by covers having circular openings of about the same diameter as a meter, each opening being surrounded by an out-turned flange. A ring is mounted on the cover around such opening to form a base to which a meter may be secured. Within the trough or box and accessible through such circular opening are connection means and clips by which a number of blades projecting rearwardly from a meter may be electrically connected to circuit wires or bussing members in the trough when the meter is mounted in place over the opening. These connection means include devices having contact elements which can be operated by means of a screwdriver or other equivalent tool through the opening to connect and disconnect the clips from their corresponding circuit wires or bussing members. In troughs of this type which are now on the market, such devices are located in the trough nearly in line with the edge of the circular aperture, so that it is difficult to operate these devices without the tool touching the flange which surrounds the aperture or the ring which surrounds the flange. Since some of these contact devices are usually charged and the trough is always grounded, contact of a metal screwdriver with both will result in a short-circuit. While screwdrivers covered with insulation are often used, such insulation is subject to wear and is therefore unreliable as a protection against such short-circuits.

According to the present invention, insulation is mounted on the trough cover itself and is also arranged so as to be out of the way but to be effective in preventing contact between a screwdriver and any metal part of the trough, including its cover and the ring thereon.

For a more complete understanding of the invention, reference may be had to the following description of an embodiment thereof, and to the drawing of which Figure 1 is a fragmentary elevation of a covered trough insulated according to the invention.

Figure 2 is a perspective view of an insulating member to be applied to a ring and cover of a meter trough.

Figure 3 is a fragmentary perspective view of a ring and a portion of a trough cover on which the ring is mounted.

Figure 4 is a fragmentary perspective view of the ring and insulating members assembled together.

Figure 5 is a section on the line 5—5 of Figure 4.

Figure 6 is a section on the line 6—6 of Figure 4.

Figure 7 is an end elevation of a trough and meter.

Figure 8 is a fragmentary elevational view of a slightly modified form of the invention.

Figure 1 shows a trough or box 10 having a cover 12. Since such troughs are usually mounted with their bottoms against vertical supporting surfaces, the cover 12 may be described as the front wall of the trough. The cover or front wall 12 may be composed of one or more sections or panels, each having one or more large circular openings therein. One such opening is shown in Figure 1, this opening being surrounded by an out-turned flange 13 and a ring 14. The latter may be permanently secured to the front wall 12 or may be removably attached thereto. This ring receives and supports a meter 15 (Figure 7). In the structure illustrated in Figure 1, the ring 14 is provided with a diametral cross bar 16 integrally cast therewith to support a pair of insulating blocks 18 and 20 which are attached thereto as by screws 22 and 24, and a series of inner lugs 25, 25a to center the meter. The ring 14, and with it the corresponding section of the front wall 12, may be anchored to the trough by a pair of screws 26 and 28 which pass through the cross bar 16 and screw into the rear wall of the trough 10. When the meter is in place on the ring 14, these anchoring screws are inaccessible. A block of insulation 30 is secured against the rear wall of the trough as by screws 32 and 34 and is provided with suitable connectors or terminals 36, 38, 40 and 42 which are adapted to clamp onto stripped portions of circuit wires or bussing members within the trough. Mounted on the blocks 18 and 20 are clips 44, 46, 48 and 50 which are adapted to receive connecting blades 51 projecting rearwardly from the meter 15. These clips are normally connected to respective terminals by switching means 52, 54, 56 and 58 respectively. Such switching means are described and illustrated in details in the McKinley and Palmer application hereinbefore referred to, and may include screws or other rotatable elements which are accessible by a tool projecting through the opening. As shown, the switching devices 52, 54, 56 and 58 are nearly in line with the edge of the opening so that a tool or screwdriver inserted to engage any one of these switching devices will be very close to the flange 13 and ring 14 and will be apt to come in contact therewith. According to the present invention, those portions of the flange 13 and ring 14 are provided with suitable insulating shields to avoid short-circuits. As indicated in Figure 3, the ring 14 surrounds the flange 13 and is secured to the outer face of the front wall 12, the inner diameter of the ring 14 being slightly larger than the outer diameter of the flange so that an annular clearance or slot 62 is left between the ring and the flange. Flexible strips 66 of insulating material, shaped as indicated in Figure 2, are mounted within the ring 14. The strips 66 are sufficiently thin to enter the clearance 62 between the flange 13 and the ring 14, and are preferably of such resilient shape-retaining material that, when bent to the arcuate shape required to fit into the ring 14, the strips tend to spring back into plane shape. "Bakelite" or an equivalent plastic is suitable for this purpose. The inner edge of each strip is cut so that portions 68 extend beyond the adjacent portions 69 of the strip and are separated therefrom by slots 70. The outer margin of the strip is cut away at the ends thereof as at 72, this resulting in end tongues 74 which are narrower than the body of the strip. The strip is mounted within the ring 14 in such a manner that the portions 68 project through the opening and bear against the inner face of the flange 13, thus covering inner face portions of the flange and ring as indicated in Figure 4, the remaining portions 69 of the strip being inserted in the clearance or slot 62 between the flange and the ring. The width of the strip is such that, when the strip is thus seated, its outer edge is substantially flush with the outer surface of the ring 14. If the strip is inserted in the ring before leaving the factory where the trough covers are made or assembled, it is desirable that it be firmly secured in place to prevent loss during shipment or in handling prior to installation. To this end, the strip may be made of sufficient length so that the ends of the tongues 74 project beneath the ends of the cross bar 16 where the cross bar joins the ring. This serves to hold the ends of the strip in the slot 62. The middle of the strip may be anchored in any suitable manner. An adhesive may be used in the slot 62, or, as shown, the flange 13 may be indented as at 76 by a punch or other suitable tool so that the strip is firmly pinched at that point between the flange and the ring. Thus the strip is anchored at both ends and the middle and is firmly secured in place. The portions 68 cover the portions of the flange 13 which are adjacent to the switching devices 52, 54, 56 and 58, so that the flange and ring, including the lugs 25, 25a, are permanently and effectively insulated from accidental contact of a screwdriver or other tool used for the operation of the switching device.

For insulating rings or troughs which have already been installed and are in use, it is sufficient to anchor the ends of each strip and to depend on the resilience or springiness of the strip to hold it in place.

Meter-supporting rings of the kind illustrated are customarily made with eight inner lugs. Of these the four which are nearest to the cross bar 16 are designated by the reference character 25; the others by the character 25a. In the meter-connection mechanism shown in Figure 1 of the drawing, the switching devices are shown as near to the lugs 25. In large numbers of troughs now in use, the switching devices are differently mounted on the blocks 18 and 20 so that they are near the lugs 25a. In such cases it is not necessary for the strips to cover the lugs 25 and shorter strips may be used, the end tongues of these strips being caught under the lugs 25 to anchor the strips, as shown in Figure 8.

Instead of two semi-circular insulating strips 66, four shorter elements may be employed, one for each of the switching devices, or a single strip approximately equal in length to the circumference of the flange 13 may be employed. Such a single strip would have to be assembled with the ring and front wall before the ring is secured in place.

It is evident that various modifications and changes may be made in the embodiments of the invention herein shown and described without departing from the spirit or scope thereof as defined in the following claims.

I claim:

1. Apparatus of the class described, comprising a box or trough having a front wall with a large circular opening therein and an out-turned flange surrounding said opening, a meter-receiving ring secured to said front wall and surrounding said flange with a slight annular clearance between, a connection device mounted within said box in a position to be operable by a tool inserted through said opening adjacent to an edge thereof, and an insulating shield secured within said ring and flange adjacent to said connection device, said shield comprising a flexible strip of insulation material having a marginal portion projecting into said opening against the inner face of said flange and other marginal portions disposed within said clearance.

2. Apparatus of the class described, comprising a box or trough having a front wall with a large circular opening therein, the margin of said wall about said opening being out-turned to form a flange, a ring surrounding said flange and mounted on said wall to receive a meter, the ring and flange having a narrow annular clearance between them, a diametral cross bar integral with said ring and extending across said opening, and a pair of strips of insulating material mounted within said ring, each said strip having its end portions disposed in said clearance and engaged under said cross bar, each said strip having a mid-portion extending into and secured in said clearance and intermediate portions extending from the rim of said ring through said opening so as to cover the adjacent inner face portions of the ring and flange.

3. Apparatus of the class described, comprising a box or trough having a front wall with a large circular opening therein, the margin of said wall about said opening being out-turned to form a flange, a ring surrounding said flange and mounted on said wall to receive a meter, the ring and flange having a narrow annular clearance between them, and a thin strip of insulating material shielding a portion of said ring and flange, said strip having a marginal portion engaging the inner face of said flange and another marginal portion pinched between said flange and ring to hold the strip in position.

4. Apparatus of the class described, comprising a box or trough having a front wall with a large circular opening therein, a margin of said wall about said opening being out-turned to form a flange, a ring surrounding said flange and mounted on said wall to receive a meter, a narrow annular clearance between the said ring and the said flange, lugs on the inner face of said ring, and a thin strip of insulating material shielding certain of the said lugs and a portion of said ring and said flange, the said strip having a marginal portion engaging the inner face of said flange and extreme portions of said strip lying beneath certain of the said lugs and also between the said ring and said flange to hold the strip in position.

GRANVILLE E. PALMER.